July 19, 1955

K. SCHLESINGER

TELEVISION CIRCUIT

Filed March 1, 1952

2,713,611

INVENTOR.
Kurt Schlesinger

BY Foorman L. Mueller

Atty.

United States Patent Office 2,713,611

Patented July 19, 1955

2,713,611

TELEVISION CIRCUIT

Kurt Schlesinger, Maywood, Ill., assignor to Motorola, Inc., Chicago, Ill., a corporation of Illinois Application March 1, 1952, Serial No. 274,398

8 Claims. (Cl. 178—69.5)

The present invention relates to television receiver circuits and more particularly to a circuit for deriving a vertical synchronization pulse for the vertical sweep oscillator of a television receiver.

The present standard television transmitting and receiving systems employ a procedure of interlace whereby succeeding picture fields are alternately shifted vertically to reduce line structure and picture flicker, as is well known. If the vertical oscillator is not precisely synchronized with the synchronization signal of the video signal, the interlaced vertical positions of succeeding picture fields may be improperly positioned and at the worst may cause an actual pairing of horizontal lines of succeeding picture fields to completely eliminate the vertical interlace. With the present use of large picture tubes, causing the space between horizontal lines to be greater, the vertical interlace should be as accurately positioned as possible or the horizontal line structure becomes objectionably pronounced.

In order to insure precise synchronization of the vertical sweep oscillator of a television receiver, the synchronizing vertical pulse output from the synchronization signal separator circuit must be as well defined as the horizontal timing pulses, i. e., in the order of 5 microseconds or better. The synchronization signal vertical pulse in the train of synchronization signals of the composite video signal is relatively long and thus by itself does not offer the necessary timing accuracy. It contains, however, a number of cutouts or serrations, which are sharp enough for precise timing. The use of these serrations for precision vertical synchronization is the object of this invention.

It is a principal object of the present invention to provide an improved vertical synchronization pulse separator circuit which will produce a vertical synchronization pulse having a controlling or synchronizing peak amplitude re-occurring precisely at the same time interval during reception of each synchronization signal vertical pulse.

Another object of the invention is to produce accurate vertical interlace of succeeding fields of a television picture by synchronizing the cathode ray vertical sweep oscillator with the occurrence of a selected one of the serrations of the synchronization signal vertical pulse, with the use of a pulse separator circuit producing a vertical synchronization pulse with a generally rising amplitude and with discrete increased amplitude pulse peaks superposed thereon having an occurrence and duration coinciding with the occurrence and duration of the serration intervals of the vertical synchronization signal pulse.

A feature of the invention is the provision of a phase inverter circuit including a vacuum tube having at least cathode, control grid and plate electrodes, with the train of synchronization signal pulses of the video signal being applied to the control grid and two output circuits being respectively connected to the cathode and plate electrodes and combined together. One of the output circuits has a time constant less than the interval between the serrations of the synchronization vertical pulse and the other output circuit has a time constant greater than the interval between the serrations whereby the combined output signal is a vertical synchronization pulse of generally increased amplitude having the desired discrete increased amplitude pulse peaks superposed thereon corresponding to the occurrence and duration of the serration intervals.

Another feature of the invention is the combination of a clipper stage such as a rectifier circuit which may be adjusted to produce a pulse output corresponding to the occurrence of pulses of accumulative amplitude and reject pulses of normal amplitude to thereby obtain precise trigger pulses from the present standard synchronization signal, useable by any known form of vertical sweep oscillator circuit.

Further objects, features, and the attending advantages of the invention will be apparent with reference to the following specification and drawings, in which.

Figures 1, 2:
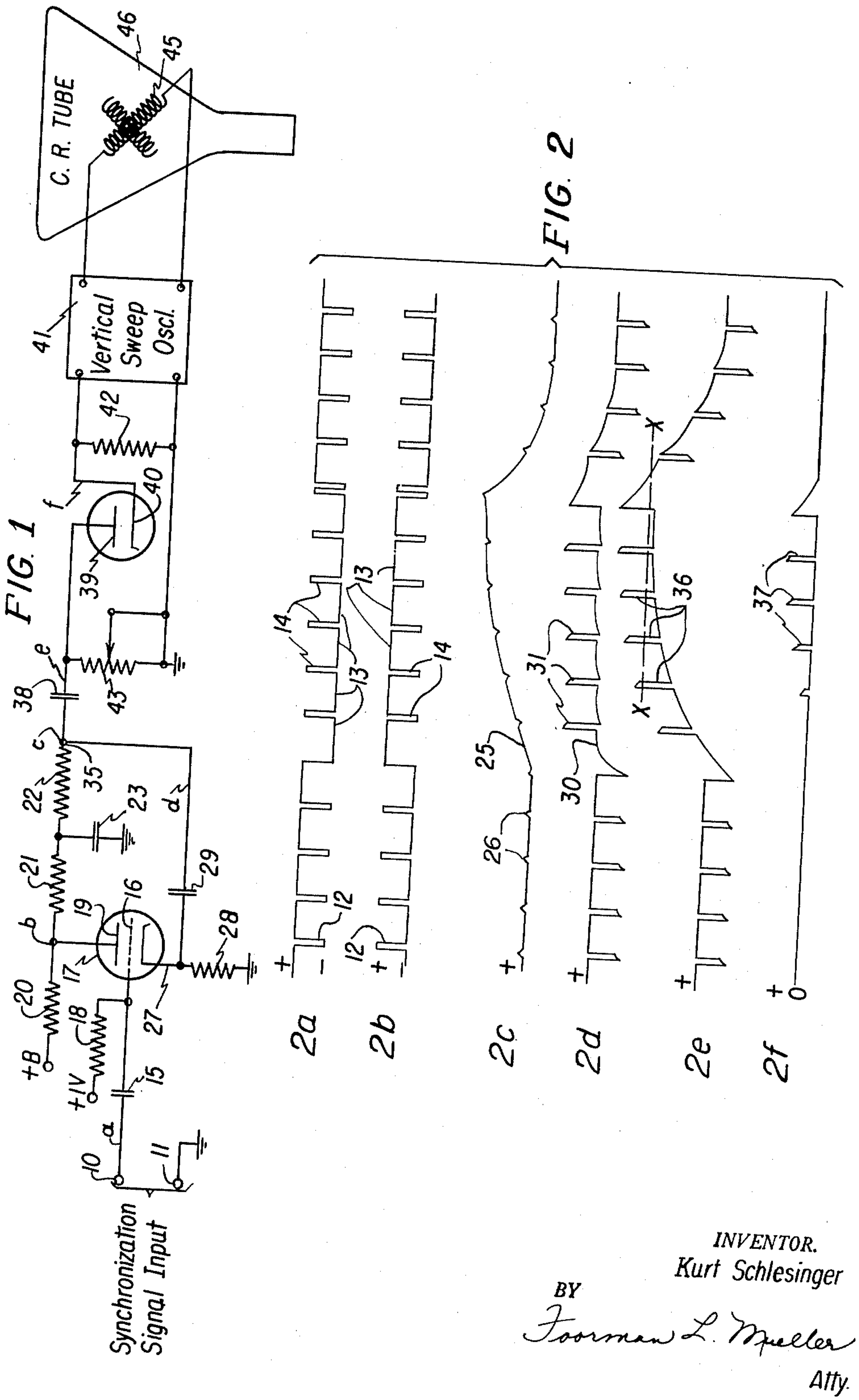
Fig. 1 is a schematic diagram partly in block outline.
Fig. 2 is a family of curves to show the signal waveforms at various parts of the circuit.

In practicing the invention according to a presently preferred embodiment, the composite synchronization signals after first being clipped off the video are applied with negative polarity to a second clipper connected in a phase inverting circuit. The grid of the second clipper tube is provided with a small positive voltage bias for its proper operation by the negative polarity input signals. A low pass circuit including a pair of series connected resistors together with a condenser is connected to the plate electrode of the clipper phase inverter tube. This plate circuit forms the low frequency path of what is generally referred to as a bridged T circuit and its element values are such as to provide a time constant of the order of 3 lines, i. e., 200 microseconds the length of the vertical synchronization signal pulse. During the occurrence of the vertical pulse, the low frequency path produces an integrated pulse output of generally rising amplitude with negligible notches occurring during the serration intervals.

A second output circuit of the high-pass type comprising a condenser forms the high frequency path or bridge of the bridged T circuit. This circuit is connected between the cathode of the phase inverter tube and the common output circuit. The second high pass path passes the serrations without inversion with respect to the input signal. The combined signal output is a waveshape of exponentially rising amplitude having superposed thereon the discrete positive voltage peaks coinciding in time and duration with the serrations of the vertical synchronization signal pulse. Such combined output signal may be used directly to synchronize the operation of a vertical sweep oscillator or may be put through a separate clipper with adjustable clipping level to produce individual discrete voltage pulses for more precise control of a vertical sweep oscillator.

Referring to Fig. 1 of the drawings, the synchronization signals after being clipped off the composite video signal are applied with negative polarity across the input terminals 10 and 11. Fig. 2*a* shows a simplified form of the synchronization signals such as may be applied to the input terminals 10 and 11, and it will be seen that equalizer pulses are shown at 12 while the vertical pulse of the synchronization signal is shown at 13 with the notches or serrations of reduced amplitude shown at 14. The synchronization signal is connected through condenser 15 to the control grid 16 of the second clipper and phase inverter tube 17. A small grid bias voltage of positive polarity is applied to the control grid 16 through the large grid resistor 18 which may be connected to a source of positive voltage. The potential on the grid then settles at about plus 1/10 volt. The plate 19 of triode tube 17 is connected through the plate load resistor 20 to the B plus terminal of the power supply (not shown). The corresponding waveform of the pulse signal appearing at the plate 19 of triode 17 is shown in Fig. 2*b* of the drawing and such output signal is now of positive polarity.

A bridged T network having a low pass arm 21, 22, 23 and a high pass arm 28, 29, 22 is connected to the plate 19 and cathode 27 of the triode 17 as shown such that both arms are fed by signals of opposite polarity, and adjustable amplitude ratio. The two outputs join across a common load, which may be a load resistor, but is, in Fig. 1, the diode 39 with its load 42.

The RC network including resistors 21 and 22 and condenser 23 is in effect a low pass filter and the values of its circuit components are such as to provide a time constant greater than the interval between the occurrence of the serration intervals 14 of the vertical pulse 13 of the synchronization signal and preferably a time component as long as the complete vertical pulse, i. e., 200 microseconds. The signal voltage waveform appearing at the output end of the resistor 22 is as shown in Fig. 2*c* of the drawings, and it will be seen that the synchronization signal vertical pulse 13 produces a positive going long pulse 25.

The second output circuit that is connected to the phase inverter tube 17 at the cathode electrode 27 is grounded through the cathode load resistor 28. This second branch includes the series condenser 29 which is effectively bridged across the low pass filter resistors 21, 22. The value of the condenser 29 is chosen to provide a time constant of the same order as the duration interval between the occurrence of the serrations 14 of the vertical pulse 13. The signal voltage waveform appearing at the output of the condenser 29 is shown by the curve 2*d* of the Fig. 2 if it is assumed for purposes of understanding the invention that the plate electrode 19 is not at that time connected to the bridge T network including resistors 21 and 22. The signal at the cathode 27 follows the signal applied to the control grid 16 except that the vertical pulse 13 causes a general rise in amplitude as indicated at 30 together with the voltage peaks 31 coinciding in time and duration with the occurrence of the serration intervals 14 of the synchronization signal vertical pulse 13.

The output signals from the cathode and plate electrodes of the phase inverter tube 17, as connected through the T network and the inverted T bridging condenser 29 are combined at the point 35 to produce a composite pulse output signal having the waveform as shown by curve 2*e* of Fig. 2. Such waveform is in effect a pulse of generally rising amplitude having superposed thereon discrete voltage pulses 36 of increased amplitude coinciding in occurrence and duration with the serration intervals 14 of the synchronization signal vertical pulse 13. Any selected one of the discrete peak voltage pulses 36 which are of different maximum amplitudes as clearly shown in Fig. 2*e* may become instrumental in synchronizing the operation of a vertical sweep oscillator of a television receiver.

Alternatively voltage pulses 36 may be clipped at the adjustable amplitude clipping level XX indicated by the dotted line on the curve 2*e* of Fig. 2 to produce a pulse output signal having the waveform shown by curve 2*f* of Fig. 2. Under such conditions of operation, the occurrence of any selected one of the voltage peaks such as the first peak voltage pulse 37 passed by the clipping circuit may be used to trigger the vertical sweep oscillator.

In order to adjust the clipping level, the signal may be connected through a coupling condenser 38 to the plate 39 of a diode rectifier whose cathode 40 may be connected to the trigger input circuits of a vertical sweep oscillator generally shown at 41. The cathode 40 is returned to ground through the load resistor 42 while the plate 39 is returned to ground through the adjustable high resistance element 43. The adjustment of the value of the leakage resistance 43 determines the setting of the clipping level XX as indicated on the curve 2*e* of Fig. 2. The vertical sweep oscillator 41 may be connected to the vertical deflection coil 45 for the television receiver cathode ray tube 46. It should be understood that any form of rectifying device may be used in place of the diode tube specifically described in connection with this third clipper stage.

Typical circuit values for one successful application of the invention as used with a B plus supply voltage of about 300 volts are listed below as follows:

| | | |
|---|---|---|
| Condenser 15 | mf | .05 |
| Condenser 23 | mf | .01 |
| Condenser 29 | mf | .001–.005 |
| Condenser 38 | mf | .1 |
| Resistor 18 | meg | 1–3 |
| Resistor 20 | ohms | 10,000 |
| Resistors 21 and 22 | do | 10,000 |
| Resistor 28 | do | 4700 |
| Resistor 42 | do | 10,000 |

Resistor 43 adjustable between 100,000 to 1 megohms.

It should be understood that the proportionate values of the two output signals as shown by the curves 2*c* and 2*d* of Fig. 2 may be varied by suitable variations of the proportionate values of the plate load resistor 20 and cathode load resistor 28 in a manner to obtain the maximum amount of amplitude differentiation between each of the successive discrete peak voltage pulses 36 which will allow the selection by the clipping circuit of any desired one of such peak voltage pulses coinciding with the occurrence of different ones of the serration intervals 14 of the synchronization signal vertical pulse 13.

In the foregoing a presently preferred embodiment of the invention has been described in which the synchronization pulses are applied to the clipper 17 with negative polarity. It should be pointed out that the principles of the invention may also be of advantage with the use of synchronization pulses of positive polarity providing that the basic teachings of the invention are observed in that two voltages of opposite sign are fed into the two branches of a bridged T, one of which has a time constant less than the repetition rate of the serrations of the vertical pulse, and the other branch having a time constant of the order of the total length of that signal.

The operation of the circuit of the invention has been referred to in the foregoing description and need not be further described except to point out that a signal output having a waveform such as shown by curves 2*e* and 2*f* of Fig. 2 enables a very precise control of the synchronization or timing of the vertical sweep oscillator in a manner to assure proper interlace of the succeeding fields of a television picture. Various modifications may be made within the spirit of the invention and the scope of the appended claims.

I claim:

1. A vertical synchronization pulse producing circuit for use in a television receiver having a cathode ray tube vertical sweep circuit synchronized by a train of synchronization signals which form a part of a composite video signal, which train of synchronization signals includes low frequency vertical synchronization pulses having a plurality of serrations defining sections of a predetermined time duration, said circuit including in combination, phase inverter means having an input circuit to which the train of synchronization pulses are applied, a first output terminal providing the synchronization signals with the vertical synchronization pulse being of one polarity, and a second output terminal providing the synchronization signals with the vertical synchronization pulse being of the opposite polarity and the serrations thereof extending in the direction of said one polarity, a first output circuit connected to said first output terminal including a low pass filter having a time constant greater than said predetermined time interval for producing a rounded pulse of said one polarity, a second output circuit connected to said second output terminal including high pass filter means for passing said synchronization signal without substantially modifying the serrations thereof, and means coupled to said output circuits for combining the pulses therefrom so that the serrations passed by said high pass filter means are superimposed upon said rounded pulse to provide discrete increased amplitude pulses occurring during said vertical synchronization pulse.

2. The vertical synchronization pulse producing circuit for use in television receivers having a cathode ray tube vertical sweep circuit to be synchronized by a vertical synchronization pulse derived from a train of synchronization signals transmitted in a composite video signal, the synchronization signal vertical pulse including a plurality of serrations re-occurring after a predetermined time interval, said circuit including in combination, a phase inverter tube having at least control grid, plate and cathode electrodes, means connecting the train of synchronization signals to the control grid of said tube, a first output circuit connected to the plate of said tube, a second output circuit connected to the cathode of said tube, one of said output circuits having a time constant greater than said time interval and the other of said output circuits having a time constant less than said time interval, and means connecting both output circuits to a common output terminal to thereby combine the output signals therefrom and produce a composite vertical synchronization pulse of generally increasing amplitude having superposed thereon discrete increased amplitude peak pulses corresponding in time and duration to the occurrence and duration of the serrations of the synchronization signal vertical pulse.

3. The vertical synchronization circuit for use in television receivers having a cathode ray tube vertical sweep circuit including a vertical oscillator to be synchronized by a vertical synchronization pulse derived from a train of vertical and horizontal synchronization signals transmitted in a composite video signal, the synchronization signal vertical synchronization pulse including a plurality of serrations reoccurring after the same time interval, the circuit including in combination, a phase inverter tube having at least control grid, plate and cathode electrodes, means connecting the train of synchronization signals to the control grid of said tube, a first output circuit connected to the plate of said tube, a second output circuit connected to the cathode of said tube, one of said output circuits having a time constant greater than said time interval for producing from said vertical synchronization pulse a rounded pulse of one polarity, the other of said output circuits having a time constant less than said time interval for passing said vertical synchronization signal without substantially modifying the serrations thereof, means connecting both output circuits to a common output terminal to thereby combine the output signals therefrom and produce a composite vertical synchronization pulse of generally increasing amplitude having superposed thereon discrete increased amplitude peak pulses corresponding in time and duration to the occurrence and duration of the serrations of the synchronization signal vertical pulse, and clipping means responding to selected ones of said peak pulses and connected to synchronize the vertical oscillator of said vertical sweep circuit.

4. The vertical synchronization circuit for use in television receivers having a cathode ray tube vertical sweep circuit including a vertical oscillator to be synchronized by a vertical synchronization pulse derived from a train of vertical and horizontal synchronization signals transmitted in a composite video signal, the synchronization signal vertical pulse including a plurality of serrations reoccurring after the same time interval, the circuit including in combination, a phase inverter tube having at least control grid, plate and cathode electrodes, means connecting the train of synchronization signals to the control grid of said tube, a first output circuit connected to the plate of said tube, a second output circuit connected to the cathode of said tube, one of said output circuits having a time constant greater than said time interval and the other of said output circuits having a time constant less than said time interval, means connecting both output circuits to a common output terminal to thereby combine the output signals therefrom and produce a composite vertical synchronization pulse of generally increasing amplitude having superposed thereon discrete increased amplitude peak pulse corresponding in time and duration to the occurrence and duration of the serrations of the synchronization signal vertical pulse, and clipping means including an adjustably biased rectifier circuit to respond to selected ones of said peak pulses and connected to synchronize the vertical oscillator of said vertical sweep circuit.

5. The vertical synchronization pulse producing circuit for use in television receivers having a cathode ray tube vertical sweep circuit to be synchronized by the vertical synchronization pulse derived from a train of vertical and horizontal synchronization signals transmitted in a composite video signal, the synchronization signal vertical pulse including a plurality of serrations reoccurring after a predetermined time interval, the circuit including in combination, a phase inverter tube having at least control grid, plate and cathode electrodes, means connecting the train of synchronization signals with negative polarity to the control grid of said tube, a first output circuit connected to the plate of said tube and having a time constant greater than said time interval for producing a rounded pulse of positive polarity from the vertical pulse, a second output circuit connected to the cathode of said tube and having a time constant less than said time interval for passing the vertical pulse with the positive serrations thereof being retained without substantial modification, and means connecting both output circuits to a common output terminal to thereby combine the output signals therefrom and produce a positive composite vertical synchronization pulse of generally increasing amplitude having superposed thereon discrete increased amplitude peak pulses corresponding in time and duration to the occurrence and duration of the serrations of the synchronization signal vertical pulse.

6. The vertical synchronization pulse producing circuit for use in television receivers having a cathode ray tube vertical sweep circuit to be synchronized by the vertical synchronization pulse derived from a train of vertical and horizontal synchronization signals transmitted in a composite video signal, the synchronization signal vertical signal pulse including a plurality of serrations reoccurring after a predetermined time interval, the circuit including in combination, a phase inverter tube having at least control grid, plate and cathode electrodes, means connecting the train of synchronization signals with negative polarity to the control grid of said tube, a first output circuit including a pair of series connected resistors and a parallel connected condenser at the junction between said resistors, said first output circuit being connected to the plate of said tube and having a time constant greater than said time interval, a second output circuit including a series connected condenser connected between the cathode of said tube and the output end of said series connected resistors and having a time constant less than said time interval, the output signals from both output circuits producing a composite vertical synchronization pulse of generally increasing amplitude having superposed thereon discrete increased amplitude peak pulses corresponding in time and duration to the occurrence and duration of the serrations of the synchronization signal vertical pulse.

7. The vertical synchronization pulse producing circuit for use in television receivers having a cathode ray tube vertical sweep circuit including a vertical oscillator to be synchronized by the vertical synchronization pulse derived from a train of vertical and horizontal synchronization signals transmitted in a composite video signal, the synchronization signal vertical pulse including a plurality of serrations reoccurring after the same time interval, the circuit including in combination, a phase inverter tube having at least control grid, plate and cathode electrodes, means connecting the train of synchronization signals with negative polarity to the control grid of said tube, a first output circuit including a pair of series connected resistors and a parallel connected condenser at the junction between said resistors, said first output circuit being connected to the plate of said tube and having a time constant greater than said time interval, a second output circuit including a series connected condenser connected between the cathode of said tube and the output end of said series connected resistors and having a time constant less than said time interval, the output signals from both output circuits producing a composite vertical synchronization pulse of generally increasing amplitude having superposed thereon discrete increased amplitude peak pulses corresponding in time and duration to the occurrence and duration of the serrations of the synchronization signal vertical pulse, and clipping means responding to selected ones of said peak pulses and connected to synchronize the vertical oscillator of said vertical sweep circuit.

8. The vertical synchronization pulse producing circuit for use in television receivers having a cathode ray tube vertical sweep circuit including a vertical oscillator to be synchronized by the vertical synchronization pulse derived from a train of vertical and horizontal synchronization signals transmitted in a composite video signal, the synchronization signal vertical pulse including a plurality of serrations reoccurring after the same time interval, the circuit including in combination, a phase inverter tube having at least control grid, plate and cathode electrodes, means connecting the train of synchronization signals with negative polarity to the control grid of said tube, a first output circuit including a pair of series connected resistors and a parallel connected condenser at the junction between said resistors, said first output circuit being connected to the plate of said tube and having a time constant greater than said time interval, a second output circuit including a series connected condenser connected between the cathode of said tube and the output end of said series connected resistors and having a time constant less than said time interval, the output signals from both output circuit thereby producing a composite vertical synchronization pulse of generally increasing amplitude having superposed thereon discrete increased amplitude peak pulses corresponding in time and duration to the occurrence and duration of the serrations of the synchronization signal vertical pulse, and clipping means including an adjustably biased rectifier circuit to respond to selected ones of said peak pulses and connected to synchronize the vertical oscillator of said vertical sweep circuit.

References Cited in the file of this patent

UNITED STATES PATENTS

| | | |
|---|---|---|
| 2,425,491 | Schlesinger | Aug. 12, 1947 |
| 2,508,923 | Mautner | May 23, 1950 |
| 2,535,247 | White et al. | Dec. 26, 1950 |
| 2,611,033 | Jones | Sept. 16, 1952 |